Dec. 7, 1943.   D. READ, JR   2,336,126
HYDROCARBON CONVERSION
Filed April 29, 1940
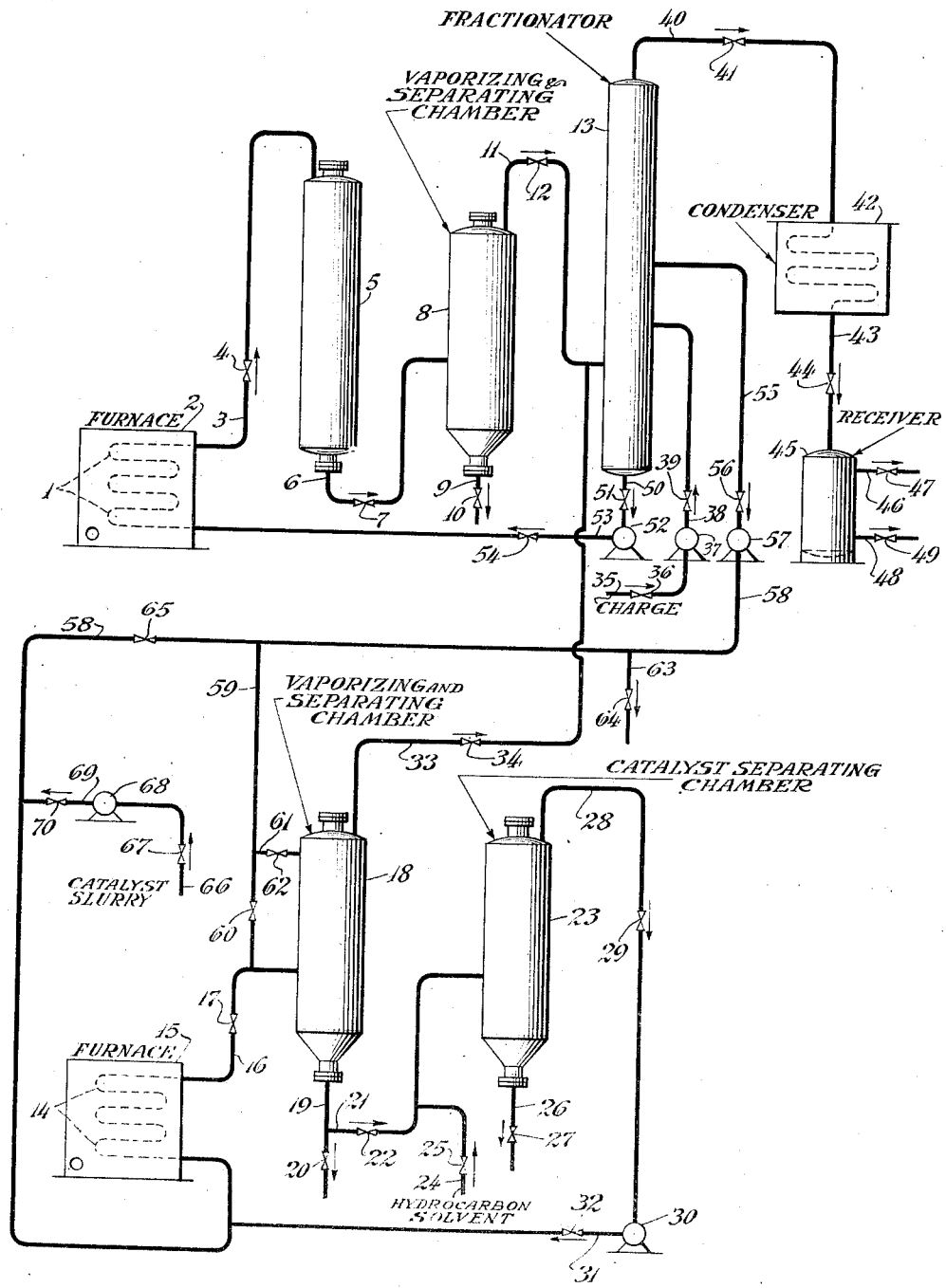

Patented Dec. 7, 1943

2,336,126

UNITED STATES PATENT OFFICE 2,336,126

HYDROCARBON CONVERSION

Davis Read, Jr., Chicago, Ill., assignor to Universal Oil Products Company, Chicago, Ill., a corporation of Delaware Application April 29, 1940, Serial No. 332,136

7 Claims. (Cl. 196—52)

This invention relates to a process for converting relatively wide boiling range hydrocarbon oils into high yields of high anti-knock gasoline and more specifically it is concerned with an improvement in the art for cracking hydrocarbon oil wherein a relatively heavy hydrocarbon oil is non-catalytically cracked and the relatively light hydrocarbon oil catalytically cracked in the presence of a catalyst suspended therein. The improvement principally involves quenching the stream of hydrocarbon oils containing the suspended catalyst as it leaves the reaction zone to arrest the cracking reaction whereby to reduce to a minimum the formation of carbonaceous and residual materials.

I have found that in the catalytic cracking of hydrocarbon oil in the presence of a catalyst suspended therein, the reaction is usually accomplished at high temperatures, and if the catalyst is allowed to remain in contact with the oil after the desired reaction is accomplished, unusually high amounts of carbonaceous materials are formed which are deposited with the catalyst in the separating zone. Residual materials formed in these reactions are usually of such a nature that they are more carbonaceous than hydrocarbonaceous, and hence are not readily soluble in hydrocarbon solvents. Hydrocarbonaceous materials, on the other hand, usually exist as a liquid, such as the heavy residual oils which are separated from the conversion products along with the catalyst, and being soluble in most hydrocarbon solvents, may be removed from the catalyst by either settling or by washing the catalyst with a suitable solvent.

In view of the above, my invention provides for quenching the stream of hydrocarbon oil containing the suspended catalyst as it leaves the reaction zone to reduce the temperature thereof to a temperature below that at which cracking is effected, after which the mixture is supplied to a vaporizing and separating chamber wherein vaporous conversion products are substantially separated from the heavier hydrocarbon oils and catalyst. Additional provisions are made for introducing a stream of cooling oil to the vaporizing and separating chamber in order to control the end point of the vaporous conversion products and the viscosity and gravity of the hydrocarbon oils removed with the catalyst. The invention also provides for supplying the mixture of catalyst and oil to a catalyst separating chamber wherein the mixture is separated into two parts, one part consisting essentially of the heavy hydrocarbon oil and spent catalyst while the second part consists of lighter oils and relatively clean catalyst with provisions for recovering the first part and returning the second part to the catalytic conversion step.

In one specific embodiment the invention comprises subjecting a relatively heavy hydrocarbon oil to pyrolytic cracking in a heating coil and communicating reaction chamber, separating non-vaporous liquid residue from the pyrolytically formed vaporous conversion products, simultaneously therewith commingling a slurry of cracking catalyst with a relatively light hydrocarbon oil and passing the mixture through a reaction zone where it is heated to a catalytic cracking temperature, quenching the heated stream of hydrocarbon oil and catalyst leaving the reaction zone to arrest the cracking reaction, separating the catalyst and heavy catalytic residue from the catalytically formed vaporous conversion products, further separating the mixture of catalytic residue and catalyst into two parts, one part consisting essentially of the heavier portion of the catalytic residue and spent catalyst and the second part consisting of relatively light catalytic residue and relatively clean catalyst, recovering the first part and returning the second part to the catalytic conversion step, commingling said catalytically formed vaporous conversion products with said pyrolytically formed vaporous conversion products and fractionating the mixture, together with the charging oil, to substantially separate fractionated vapors boiling in the range of gasoline from the higher boiling conversion products and heavier portions of the charging oil, recovering said fractionated vapors, condensing said higher boiling conversion products and said heavier portions of the charging oil as light and heavy reflux condensates, supplying said heavy reflux condensate to the pyrolytic conversion step as said relatively heavy oil, and supplying said light reflux condensate to the catalytic conversion step as said relatively light hydrocarbon oil.

The accompanying diagrammatic drawing illustrates in conventional side elevation one specific form of the apparatus which may be employed to accomplish the objects of the invention.

Referring now to the drawing, heavy reflux condensate formed in the manner to be described later is suplied to heating coil 1. The heavy reflux condensate in passing through heating coil 1 is raised to the desired conversion temperature which may range, for example, from 850 to 1000° F., or more, by means of heat supplied from furnace 2. The heavy reflux condensate leaving heating coil 1 at an outlet pressure ranging, for example, from 100 to 500 pounds or more per square inch is directed through line 3 and valve 4 into reaction chamber 5. Reaction chamber 5 is preferably maintained at substantially the same pressure or at a slightly lower pressure than that employed on the outlet of heating coil 1 and is preferably insulated to reduce radiation losses therefrom, although no insulation is shown in the drawing.

The heated reflux condensate in passing through reaction chamber 5 is subjected to prolonged pyrolytic conversion at the elevated temperature and the resulting conversion products are discharged therefrom through line 6 and valve 7 into vaporizing and separating chamber 8. Vaporizing and separating chamber 8 is preferably maintained at a reduced pressure relative to that employed in reaction chamber 5 ranging, for example, from substantially atmospheric to 400 pounds or more per square inch in order to obtain a separation between the vaporous and liquid conversion products and to effect substantial further vaporization of the liquid conversion products to form a non-vaporous liquid residue. Non-vaporous liquid residue separated in chamber 8 is removed therefrom by way of line 9 and valve 10 and may be recovered as a product of the process or subjected to any desired further treatment. Vaporous conversion products, together with vapors evolved within chamber 8, are directed through line 11 and valve 12 into fractionator 13 for treatment in the manner to be described later.

Simultaneously with the pyrolytic conversion treatment of the heavy reflux condensate as above described, light reflux condensate to which powdered catalyst is added in the manner to be described later, is supplied to heating coil 14. The slurry of catalyst and oil in passing through heating coil 14 is raised to the desired conversion temperature ranging, for example, from 500 to 1200° F., heat being supplied by means of furnace 15. Preferably also, heat is supplied to the slurry of catalyst and oil in heating coil 14 at a rapid rate so as to minimize the amount of pyrolytic cracking effected and increase the amount of catalytic cracking. When desired, a reaction zone other than a heating coil may be employed, however, in view of the fact that control of the heating is more readily obtained in a heating coil than in other types of reaction vessels the method illustrated is the preferred method.

The heated mixture of oil and catalyst leaving heating coil 14 at a pressure ranging, for example, from substantially atmospheric to 1000 pounds or more per square inch is directed through line 16 and valve 17 and, in accordance with the objects of the invention, is commingled with a cooler stream of hydrocarbon oil introduced in the manner to be described later in order to quench the stream of hot oil to a temperature ranging, for example, from 400 to 800° F., and the resulting mixture of conversion products, cooling oil, and catalyst is supplied to vaporizing and separating chamber 18. Chamber 18 is preferably operated at a reduced pressure relative to that employed on the outlet of heating coil 14 ranging, for example, from substantially atmospheric to 400 pounds or more per square inch whereby to separate vaporous conversion products from the liquid conversion products and catalyst. Preferably also, cooling oil is supplied to chamber 18 in the manner to be described later in order to adjust the viscosity and gravity of the heavy oil removed with the catalyst from the bottom of chamber 18 and to control the end point of the vaporous conversion products separated in chamber 18.

When desired, chamber 18 may be operated as a catalyst separating chamber wherein the catalyst is reduced to a substantially dry powder containing a high proportion of carbonaceous materials formed by reducing the liquid residue to a substantially dry coke. In such cases, however, it would be desirable to employ more than one chamber in order that one or more of the chambers may be cleaned while other or others are employed in the conversion treatment. In this type of operation the catalyst is removed as a substantially dry powder containing a high proportion of carbonaceous material and may be supplied to a catalyst regenerating system, not shown in the drawing, to prepare the catalyst for reuse.

In the preferred treatment, however, the liquid hydrocarbons and catalyst separated in chamber 18 are removed therefrom by way of line 19 and may be directed through valve 20 and recovered in this form for separation of the catalyst and oil in a system not included in the process. Preferably, however, the catalyst and oil in line 19 are directed through line 21 and valve 22 into catalyst separating chamber 23 wherein the mixture is allowed to settle into two parts, the carbonized or spent catalyst being of a greater particle size will settle with the heavy hydrocarbon oil while the relatively clean catalyst will remain in suspension in the light oil. When desired, a hydrocarbon solvent, such as light reflux condensate, gasoline, or kerosene, or any light hydrocarbon oil formed in the process, or a light hydrocarbon oil introduced from an external source supplied by way of line 24 and valve 25, may be commingled with the stream of hydrocarbon oil and catalyst in line 22 in order to reduce the viscosity and gravity thereof to thus serve as a diluent during the settling operation.

The heavy oil and spent catalyst separated in chamber 23 is removed therefrom by way of line 26 and valve 27 and recovered or subjected to any desired further treatment to revivify the catalyst. The lighter portion of the hydrocarbon oil and relatively clean catalyst separated in chamber 23 are removed therefrom by way of line 28 and directed through valve 29 to pump 30, which discharges through line 31 and valve 32 into line 58, commingling therein with the light reflux condensate and catalyst supplied to heating coil 14 for treatment in the manner previously described.

The vaporous conversion products separated in chamber 18 are removed therefrom by way of line 33 and directed through valve 34 into line 11, commingling therein with the vapors removed from chamber 8, which mixture is supplied to fractionator 13. Fractionator 13 and the condensing and receiving equipment in communication therewith are preferably operated at a superatmospheric pressure of the same order as that employed in chambers 8 and 18. Simultaneously with the introduction of the vaporous products to fractionator 13, charging oil which may comprise, for example, a relatively wide boiling range hydrocarbon oil such as crude oil or reduced crude oil or any desired fraction thereof, is introduced through line 35 and valve 36 to pump 37, which discharges the charging oil through line 38 and valve 39 into fractionator 13.

The charging oil and vaporous products supplied to fractionator 13 are fractionated therein to separate fractionated vapors boiling substantially in the range of gasoline from the higher boiling vaporous conversion products and heavier portions of the charging oil, the heavier portions of the vapors and charging oil being condensed and collected as light and heavy reflux condensates. Fractionated vapors separated in fractionator 13 are directed through line 40 and valve 41 to cooling and condensation in condenser 42. Distillate, together with undissolved and uncondensed gases from condenser 42, is directed through line 43 and valve 44 into receiver 45 wherein the distillate and gases are collected and separated. Normally gaseous products collected and separated in receiver 45 are removed therefrom by way of line 46 and valve 47 and recovered as a product of the process or subjected to any desired further treatment. The portion of the distillate collected and separated in receiver 45 may be returned to the upper portion of fractionator 13 to serve as a refluxing and cooling medium while the residual portion thereof may be removed from receiver 45 by way of line 48 and valve 49 and recovered as a product of the process.

Heavy reflux condensate condensed and separated within fractionator 13 is removed therefrom by way of line 50 and is directed through valve 51 to pump 52, which discharges through line 53 and valve 54 into heating coil 1, the heavy reflux condensate being subjected to treatment as previously described.

Light reflux condensate separated in fractionator 13 is directed through line 55 and valve 56 to pump 57. Pump 57 discharges through line 58 and a portion is directed through line 59 and valve 60 into line 16 to serve as a quenching oil as previously described. Another portion, when desired, may be directed through lines 59 and 61 and valve 62 into the upper portion of chamber 18 to serve as a cooling medium therein. Still another portion thereof may be removed from the system by way of line 63 and valve 64 for use in preparing the catalyst slurry in the manner to be described later or for use as the hydrocarbon solvent which is mixed with the oil and catalyst in line 21 as previously described. The residual portion of the light reflux condensate in line 58 is directed through valve 65 and is commingled with a slurry of cracking catalyst prepared in the manner to be described later and the mixture supplied to heating coil 14 for treatment as previously described.

The catalyst slurry comprising, for example, a mixture of powdered cracking catalyst and light reflux condensate or any relatively light hydrocarbon oil of characteristics similar to those of the light reflux condensate is supplied to the system by way of line 66 and is directed through valve 67 to pump 68 which discharges through line 69 and valve 70 into line 58, commingling therein with the light reflux condensate as previously described.

Catalysts which have been found to be effective in the catalytic cracking of hydrocarbon oils may comprise, for example, powder or granules of silica or other silicious and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors.

Although the catalysts above recited are generally considered to be the preferred catalysts, their use is not to be construed as a limiting feature, for various other catalysts well known to those in the art may be employed within the broad scope of the invention.

An example of one specific operation of the process as it may be employed in an apparatus such as illustrated and above described is approximately as follows: Heavy reflux condensate formed in the manner to be described later is subjected to pyrolytic cracking in a heating coil and communicating reaction chamber at a temperature of 940° F. and at a superatmospheric pressure of 200 pounds per square inch. The resulting conversion products are supplied to a vaporizing and separating chamber operated at a superatmospheric pressure of 50 pounds per square inch wherein non-vaporous liquid residue is separated from the pyrolytic vaporous conversion products and the former recovered as a product of the process.

Simultaneously with the pyrolytic treatment of the heavy reflux condensate, light reflux condensate to which approximately 2% of a powdered silica-alumina catalyst is added is supplied to a heating coil and heated therein to a temperature of approximately 980° F. and at a superatmospheric pressure of approximately 50 pounds per square inch. The heated stream of conversion products containing the suspended powdered catalyst is cooled to a temperature of approximately 750° F. by commingling therewith a portion of the light reflux condensate and the mixture of cooling oil, conversion products, and catalyst is supplied to a separating chamber operated at a superatmospheric pressure of approximately 50 pounds per square inch wherein vaporous conversion products are separated from the liquid hydrocarbons and catalyst.

The liquid hydrocarbons containing the suspended catalyst are supplied to a catalyst separating chamber wherein the mixture is separated into two parts, one part comprising essentially a heavy residual oil and spent catalyst and the second part the lighter oil and relatively clean catalyst. The first part is removed and subjected to any well known treatment for revivification of the spent catalyst while the second part is returned to the catalytic conversion step.

The catalytic and pyrolytic conversion products are fractionated, together with the charging oil, the latter comprising a 24° A. P. I. gravity Mid-Continent reduced crude oil. In the fractionation fractionated vapors of approximately 400 end point are separated from the higher boiling conversion products and higher boiling portions of the charge. The fractionated vapors are subjected to cooling and condensation and the resulting distillate and gas separately recovered. The higher boiling conversion products and heavier portions of the charge are condensed and separated in the fractionating zone as light and heavy reflux condensates. The light reflux condensate is supplied to the catalytic conversion step and the heavy reflux condensate to the pyrolytic conversion step.

When employing conditions as above described, this operation will yield approximately 55% of 400 end point gasoline of 76 octane number, approximately 34% of liquid residue, the balance being principally gas and loss.

I claim as my invention:

1. In a hydrocarbon oil selective cracking process wherein vaporous conversion products formed in the process are separated by fractionation into fractionated vapors boiling in the range of gasoline and light and heavy reflux condensates, said heavy reflux condensate subjected to pyrolytic conversion, said light reflux condensate subjected to catalytic conversion and the conversion products from both fractionated as aforesaid, the improvement which comprises accomplishing said catalytic conversion by commingling said light reflux condensate with a powdered catalyst to form a slurry, passing the resulting slurry in a restricted stream through a heating zone and therein subjecting the same to a conversion temperature, quenching the stream of hot oil and catalyst as it leaves the heating zone sufficiently to arrest the cracking reaction by commingling therewith a stream of colder oil, supplying the mixture of cooling oil, conversion products, and catalyst to a vaporizing and separating chamber wherein vaporous hydrocarbons are separated from the liquid hydrocarbons and catalyst, subjecting said vaporous hydrocarbons to fractionation in commingled state with the pyrolytic vaporous conversion products, supplying said liquid hydrocarbons and catalyst to a catalyst separating chamber wherein they are separated into two parts, one part consisting essentially of the heavy liquid hydrocarbons and spent catalyst and the second part of the lighter liquid hydrocarbons and relatively clean catalyst, recovering the first part and returning the second part to the catalytic conversion step.

2. The process defined in claim 1 further characterized in that the quenching oil consists essentially of a portion of the light reflux condensate formed in the process.

3. A process for the production of motor fuel, which comprises subjecting a relatively heavy oil to pyrolytic cracking, separating the resulting conversion products into pyrolytic vaporous conversion products and non-vaporous liquid residue, simultaneously therewith commingling a relatively light hydrocarbon oil with powdered cracking catalyst to form a slurry, supplying the resulting slurry to a reaction zone wherein it is heated to a conversion temperature, quenching the stream of hot oil and catalyst leaving said reaction zone sufficiently to arrest the cracking reaction by commingling therewith a colder stream of hydrocarbon oil, supplying the resulting mixture of cooling oil, catalyst, and catalytic conversion products to a vaporizing and separating chamber wherein vaporous products are separated from the liquid hydrocarbons and catalyst, commingling said vaporous products with said pyrolytic vaporous conversion products and fractionating the mixture together with the charging oil to separate fractionated vapors boiling in the range of gasoline from the higher boiling conversion products and charging oil, recovering said fractionated vapors, condensing said higher boiling conversion products and charging oil as light and heavy reflux condensates, supplying said heavy reflux condensate to the pyrolytic conversion treatment as said relatively heavy oil, supplying at least a portion of said light reflux condensate to the catalytic conversion step as said relatively light hydrocarbon oil, supplying the liquid hydrocarbons and catalyst removed from the second mentioned vaporizing and separating chamber to a catalyst separating chamber wherein the mixture is separated into two parts, one part consisting essentially of the heavy liquid hydrocarbons and spent catalyst which is recovered and the second part consisting essentially of the light hydrocarbons and relatively clean catalyst which is returned to the catalytic conversion step.

4. The process defined in claim 3 further characterized in that a portion of the light reflux condensate is commingled with the stream of hot oil and catalyst as the quenching oil.

5. The process defined in claim 3 further characterized in that a portion of the light reflux condensate is supplied to the vaporizing and separating chamber to control the gravity and viscosity of the liquid hydrocarbons removed with the catalyst from the lower portion thereof.

6. A hydrocarbon oil conversion process which comprises subjecting the oil to catalytic conversion conditions in admixture with a powdered catalyst, separating resultant vapors from liquid conversion products containing the powdered catalyst, separating the catalyst-containing liquid into two parts, one comprising heavy hydrocarbons and substantially spent catalyst particles and the other comprising lighter hydrocarbons and cleaner catalyst particles, withdrawing the first-mentioned part from the process and returning the second-mentioned part to the catalytic conversion step.

7. The process as defined in claim 6 further characterized in that a relatively light hydrocarbon oil is commingled with said catalyst-containing liquid to be separated into said parts.

DAVIS READ, Jr.